July 6, 1937.   C. NELSON   2,086,044
PRESSURE COOKER
Filed Oct. 26, 1934   2 Sheets-Sheet 1

INVENTOR
CARL NELSON
BY
ATTORNEYS

July 6, 1937.   C. NELSON   2,086,044
PRESSURE COOKER
Filed Oct. 26, 1934   2 Sheets-Sheet 2

INVNTOR
CARL NELSON
ATTORNEYS

Patented July 6, 1937

2,086,044

UNITED STATES PATENT OFFICE 2,086,044

PRESSURE COOKER

Carl Nelson, Eau Claire, Wis., assignor to National Pressure Cooker Company, Eau Claire, Wis., a corporation of Wisconsin Application October 26, 1934, Serial No. 750,197

7 Claims. (Cl. 53—2)

This invention relates to new and useful improvements in pressure cookers, and an important object of the invention is to provide a simple and inexpensive means for detachably securing the cover to the cooker body in leak-proof relation.

A further object of the invention is to provide a pressure cooker having an expansible ring for securing the cover in position upon the cooker body.

Other objects of the invention reside in the specific construction of the expansible cover securing means, which is in the form of a split ring having means for expanding it to thereby secure the cover in position upon the cooker body; in the means provided whereby the cover cannot accidentally be blown off the cooker body, when the clamping ring is contracted to release the cover; in the means provided upon the cover and the securing ring adapted for interlocking engagement with means on the cooker body, when the cover and ring are in operative positions thereon; in the unique manner of mounting the usual pressure gauge and safety valve upon the cover of the cooker, whereby they are not likely to become damaged, if the cover is inverted upon a table, or should it accidentally be dropped upon a floor; and, in the simple and inexpensive construction of the expansible ring, whereby the latter may be conveniently expanded and contracted by the manipulation of a single operating screw, whereby the operation of securing the cover to the cooker body or removing it therefrom is greatly simplified.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
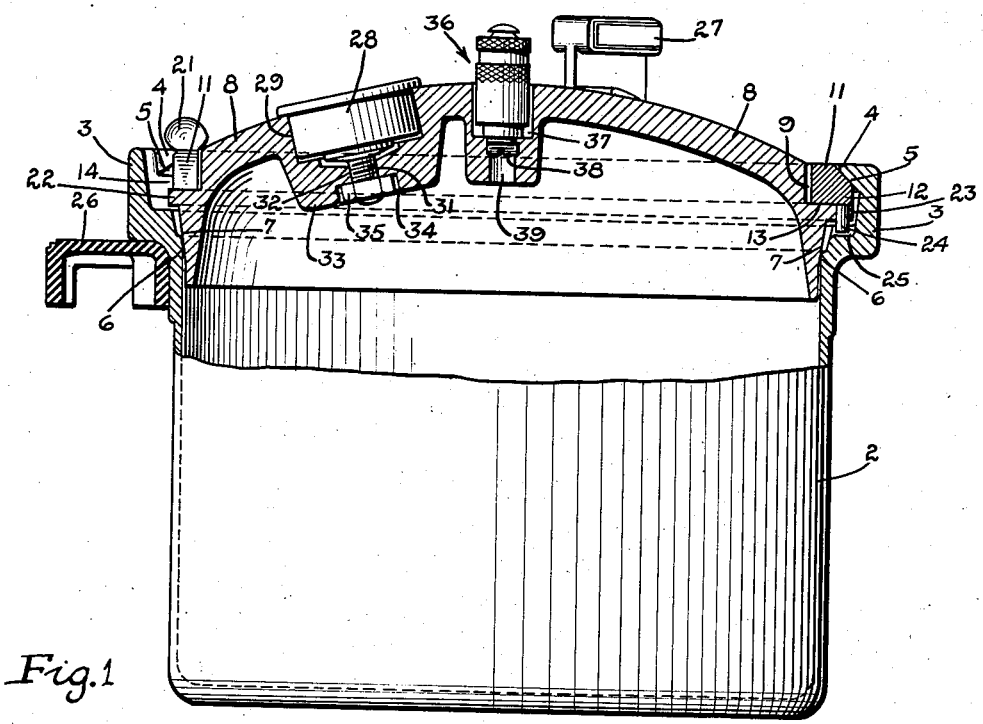
Figure 1 is a partial sectional view substantially on the line 1—1 of Figure 2, showing the construction of the upper portion of the cooker.

In the selected embodiment of the invention here shown, there is illustrated in Figure 1, a pressure cooker comprising a body portion 2 having an outwardly extending annular portion 3 at its upper end provided with a plurality of inwardly extending lugs 4, equally spaced around the open top of the cooker body and each provided with an inclined face 5.

An annular inclined seat 6 is provided adjacent the top of the cooker body adapted to be engaged by the conical or tapered face 7 of a cover 8, which preferably is dome-shaped, as best shown in Figure 1.

Figure 2:
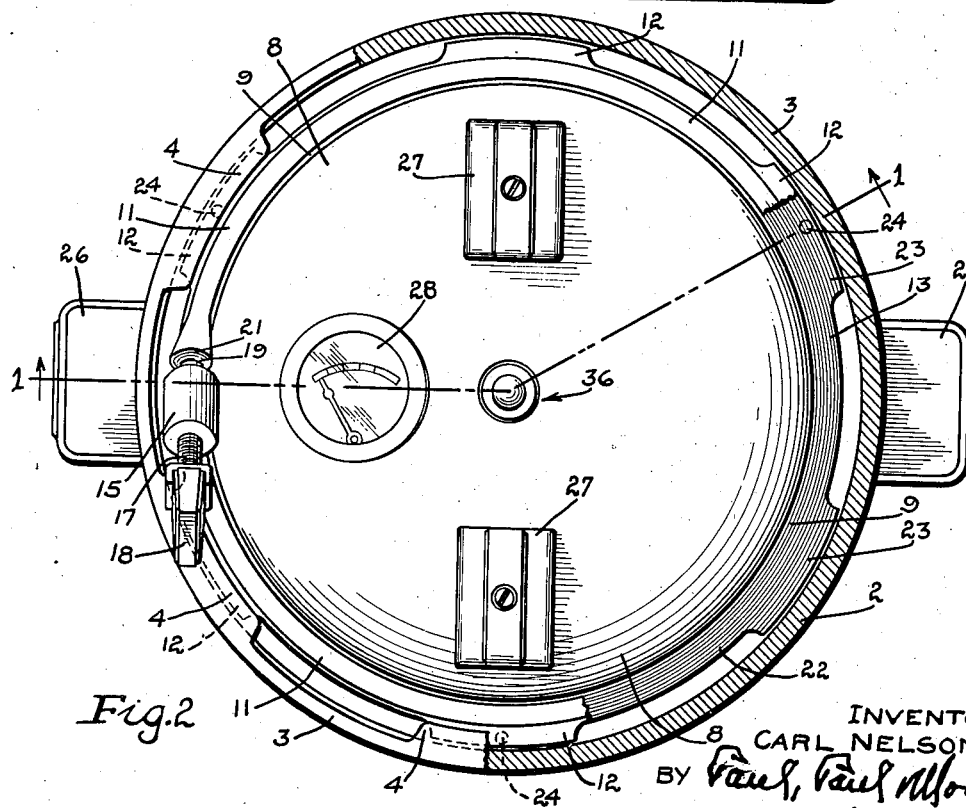
Figure 2 is a plan view of Figure 1, partially broken away to more clearly show the relative positions of the interlocking means provided on the cooker body and cover and the expansible cover securing ring.

The cover has an annular recess 9 adapted to receive a split ring 11, provided with a plurality of outwardly extending spaced lugs 12 having upper inclined faces adapted to engage the corresponding faces 5 of the lugs 4 of the cooker body, when the ring is in the position shown in Figures 1 and 2. The ring, when in operative position, is seated on the horizontal bottom surface 13 of the recess 9, as clearly illustrated in Figure 1.

Figure 4:
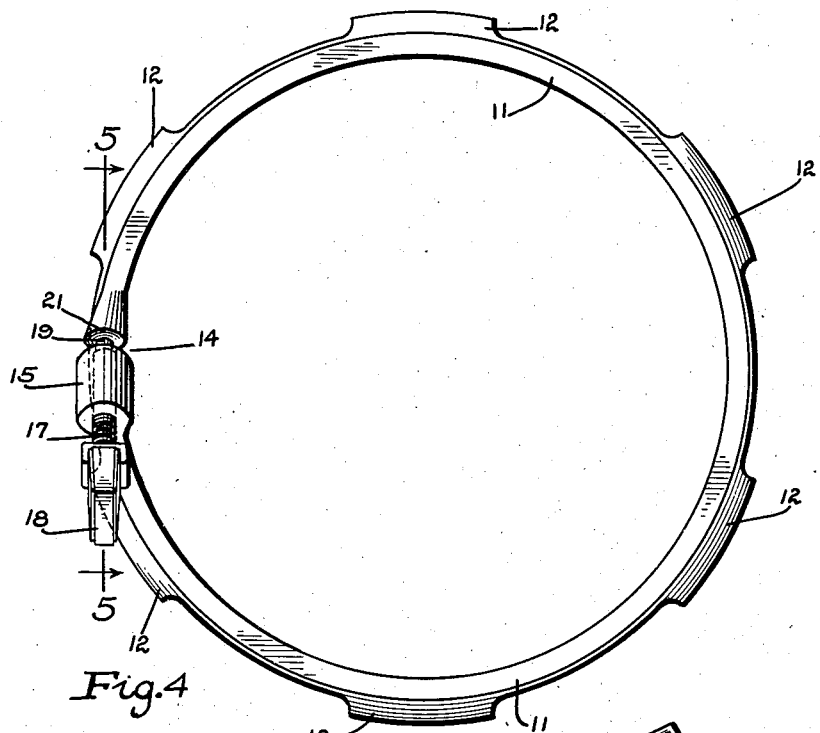
Figure 4 is a plan view of the expansible ring removed from the cooker.
Figure 5:
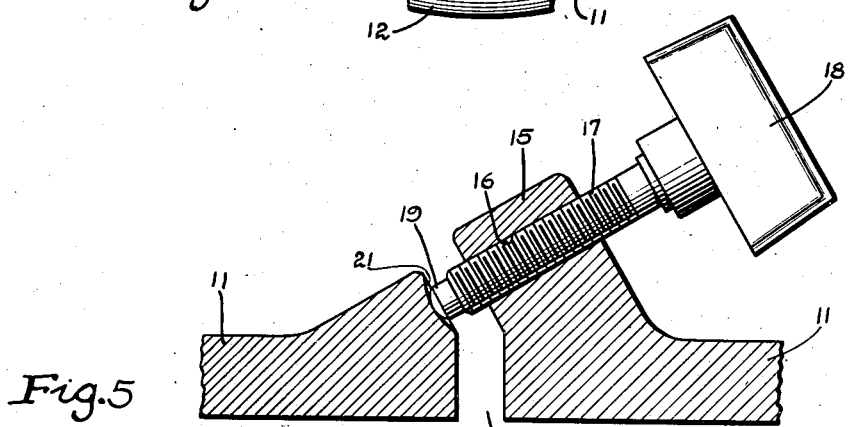
Figure 5 is an enlarged detail sectional view substantially on the line 5—5 of Figure 4, showing the single operating screw for expanding the ring.

The cover securing ring 11 is split, as indicated at 14 in Figures 4 and 5, and has a lug 15 at one end provided with a threaded aperture 16, adapted to receive an operating screw 17 having a suitable head 18, whereby it may be conveniently manipulated. The terminal 19 of the operating screw engages an inclined concaved face 21, provided in the opposite or adjacent end of the securing ring 11, whereby when the operating screw 17 is rotated in one direction, the ends of the securing ring will be forced apart, whereby the inclined faces of the lugs 12 of the ring will wedgingly engage the inclined faces of the lugs 4 of the cooker body; and thereby firmly force the cover into sealing engagement with the seat 6, as a result of the downward pressure exerted thereon by the securing ring 11.

The cover 8 has an annular flange 22, the periphery of which is provided with a plurality of spaced lugs 23, as best shown in Figure 2. These lugs are of substantially the same length as the lugs 12 of the securing ring 11. It is also to be noted, by reference to Figure 3, that the spaces provided between the lugs 4 of the cooker body are relatively longer than the length of the lugs on the cover and securing ring, whereby said lugs may readily be received between the lugs 4 of the cooker body, as illustrated in Figure 3.

Figure 3:
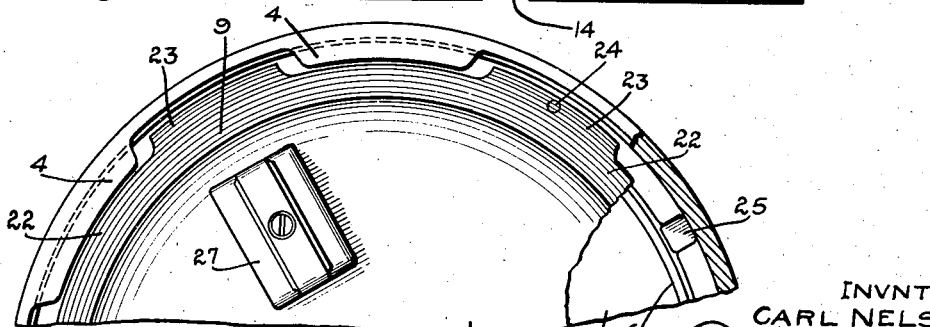
Figure 3 is a detail sectional view showing the clamping ring removed and the cover positioned for removal from the cooker body.

To secure the cover to the cooker body, the cover is placed on the cooker body, as shown in Figure 3, and then relatively rotated until the lugs 23 of the cover are positioned directly beneath the lugs 4 of the cooker body, as shown in Figure 2. The securing ring is then fitted onto the cover with its lugs 12 passing through the spaces between the lugs 4 of the cooker body, after which it is relatively rotated with respect to the cover, to thereby move its lugs 12 into alinement with the lugs 4 and 23 of the cooker body and cover, respectively, as shown at the left hand side of Figure 2. The operating screw 17 is then rotated to expand the securing ring 11, whereby the cover is tightly forced into sealing engagement with its seat 6.

By thus securing the cover to the cooker body, the cover cannot accidentally be blown from the cooker, when the securing ring is contracted to release the cover, because of the lugs 4 of the cooker body overhanging the corresponding lugs on the securing ring and cover. Before the cover can be removed from the cooker body, the clamping ring must be removed, after which the cover is relatively rotated upon the cooker body to move its lugs 23 into alinement with the spaces between the lugs 4 on the cooker body, whereby the cover may readily be lifted off the cooker.

To positively prevent the cover from accidentally being removed from the cooker body, before the pressure has been released from the cooker, suitable pins or downwardly extending projections 24 may be provided in certain of the lugs 23 of the cover, as shown in full lines in Figure 1 and dotted lines in Figure 2. The terminals of these pins or projections are adapted to be received in recesses or depressions 25 formed in the upper portion 3 of the cooker body, as clearly illustrated in Figures 1 and 3. When the pins 24 are received in the recesses 25, the cover cannot be relatively rotated upon the cooker body without first lifting it out of engagement with the seat 6, whereby the pressure or steam within the cooker body will escape to the atmosphere before the cover can be relatively rotated to a position to permit its removal from the cooker body. While the pins 25 may not be absolutely necessary in a pressure cooker of the character herein disclosed, they are desirable in that the cover cannot possibly be rotated to a position to permit its complete removal from the cooker body, without first bodily lifting the cover out of engagement with its seat before it can be rotated so that the lugs 23 thereof may pass between the lugs 4 of the cooker body.

The cooker body may be provided with suitable lifting handles 26, as shown in Figures 1 and 2, which are preferably made from a suitable non-conducting material such, for example, as bakelite, suitably secured to the upper portion of the cooker body. In like manner, the cover 8 is provided with suitable finger grips 27, whereby it may be conveniently handled when placing it upon the cooker body or removing it therefrom.

Another feature of the present invention resides in the novel manner of mounting the usual pressure gauge 28 upon the cover. As best shown in Figure 1, the pressure gauge 28 is mounted in a suitable recess 29, formed in the upper surface of the cover, whereby the dial or face of the gauge 28 is substantially flush with the upper surface of the cover. By thus mounting the pressure gauge, it is protected so that it cannot readily be damaged when the cover is removed from the cooker body and placed in an inverted position. The gauge is shown provided with a threaded extension 31, received in an aperture 32 provided in a boss 33, shown integrally formed with the wall of the cover, and having a small recess 34 therein adapted to receive a clamping nut 35.

The safety valve, generally indicated by the numeral 36, is also shown mounted in a recess or well 37 provided in the wall of the cover 8, whereby the uppermost portion of said valve is positioned at a level below the uppermost portions of the hand grips 27, as clearly illustrated in Figure 1. The safety valve has a threaded extension 38 received in threaded engagement with a socket 39, which is open at its bottom, whereby the steam may pass upwardly through the safety valve 36 and escape to the atmosphere, when the safety valve is opened by the pressure within the cooker body.

In cookers of ordinary construction, the usual pressure gauge and safety valve are so mounted upon the cover that they project considerably above the hand grips 27, whereby they may readily be damaged when the cover is inverted upon a table, or in the event that it is accidentally dropped. By mounting the pressure gauge and safety valve, as herein disclosed, these parts are protected by the hand grips 27, when the cover is inverted, whereby the danger of damage thereto is greatly minimized. By lowering the pressure gauge and safety valve, as illustrated in Figure 1, the overall height of the cooker, as a whole, is also reduced, which is desirable, as it requires less space for packing.

I claim as my invention:

1. In combination with a pair of elements adapted to be secured together in fixed relation, an expansible device comprising a circular, ring-like body adapted to be received between said elements, said device being split to provide adjacently disposed relatively movable ends, a lug on one of said ends having a threaded socket arranged at an incline to the medial plane of the body, a seat in the other end aligned with said socket, and a member received in threaded engagement with said socket and having one end engaging said seat, rotation of said member in one direction causing the device to expand and secure together said elements, and rotation of the member in the opposite direction, freeing said elements, whereby they may be readily separated.

2. In a pressure cooker, a body having an open top provided with an annular seat, a cover having a depending flange fitting into the open top of the cooker and engaging said seat, means on the cooker body arranged to overhang a portion of the cover, when the latter is in a certain position thereon, a split ring seated on the cover and having means adapted to be disposed beneath the overhanging means on the cooker body, and a screw received in threaded engagement with one end only of the expansion ring and having a terminal adapted to engage the other end of the ring, whereby when the screw is rotated in one direction, the ring will be expanded, thereby to tightly secure the cover to its seat.

3. In a pressure cooker, a body having an open top provided with an annular seat, a cover having a portion adapted to engage said seat, inwardly projecting means on the cooker body adapted to overhang a portion of the cover, and an expansible ring seated on the cover and having outwardly projecting means adapted to be moved into registration with the inwardly projecting means on the cooker body, and a screw received in threaded engagement with one end only of the ring and having a terminal adapted to engage the other end of said ring, thereby to expand the ring when the screw is rotated, whereby the outwardly projecting means on the ring will engage the inwardly projecting means on the cooker body and thereby force the cover tightly onto its seat.

4. In a pressure cooker, a body having an open top provided with an annular tapered seat, a cover having a portion adapted to engage said seat and provided with an outwardly extending annular flange, spaced lugs on said flange, inwardly projecting means on the cooker body adapted to overhang the lugs on the cover, a split ring adapted to be seated on the flange of the cover and having means for wedgingly engaging the inwardly projecting means on the cooker body, and a single adjusting screw supported in one end of the ring and adapted to engage the other end thereof and expand the ring and thereby force the cover onto its seat.

5. In a pressure cooker, a body having an open top provided with an annular seat, a cover having a portion adapted to engage said seat, a plurality of outwardly projecting lugs on the periphery of the cover, inwardly projecting spaced lugs on the cooker body adapted to overhang the lugs on the cover, when the cover is relatively rotated thereon, an expansible ring interposed between the lugs on the cover and cooker body, and an adjusting screw received in threaded engagement with one end of the ring and having its terminal adapted to abuttingly engage the other end of the ring, whereby when the adjusting screw is rotated in one direction, the ring is expanded to thereby secure the cover in sealing engagement with said seat.

6. In a pressure cooker, a body having an open top provided with an annular seat, a cover having a portion adapted to engage said seat, a plurality of outwardly projecting lugs on the periphery of the cover, inwardly projecting spaced lugs on the cooker body adapted to overhang the lugs on the cover, when the cover is relatively rotated thereon, an expansible ring interposed between the lugs on the cover and the lugs on the cooker body and adapted, when expanded to secure the cover in sealing engagement with said seat, and means requiring that the cover be unseated before it can be relatively rotated upon the cooker body to permit its removal therefrom.

7. In a pressure cooker, a body having a seat therein, a closure adapted to be seated on said seat and having an upwardly curved top wall projecting above the marginal edge of the closure, a pair of upstanding handles arranged in spaced relation on the closure, and a safety device mounted on the closure between said handles, the uppermost portion of said safety device being disposed at an elevation below the uppermost portions of said handles, whereby when the closure is placed in an inverted position upon a table, the handles will prevent the safety device from contacting the table, whereby it is protected against damage.

CARL NELSON